Feb. 21, 1950 — A. G. TACKETT — 2,498,612
TRAP HOOK
Original Filed July 30, 1941
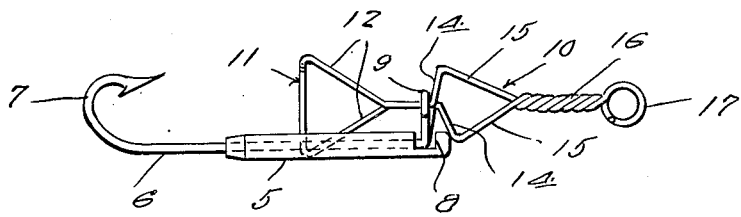
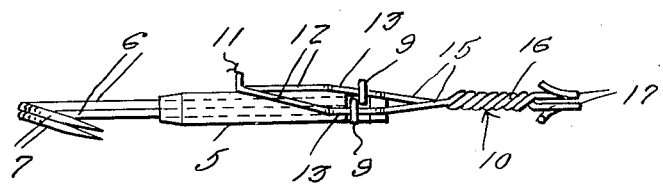
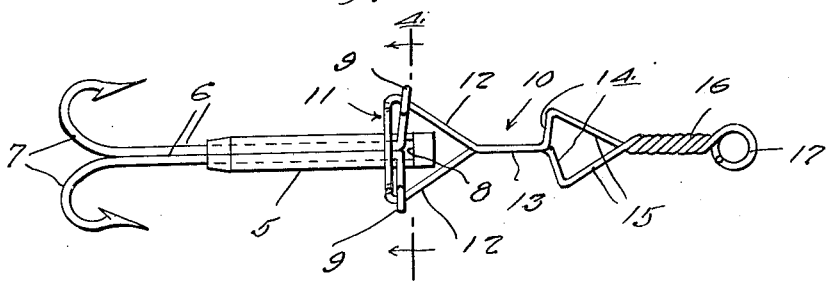
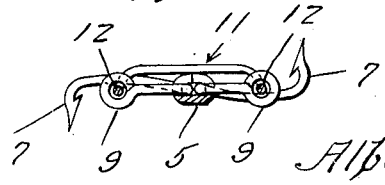
Inventor
Albert G. Tackett
By Clarence A. O'Brien
Attorney Patented Feb. 21, 1950

2,498,612

UNITED STATES PATENT OFFICE 2,498,612

TRAP HOOK

Albert G. Tackett, Bethel, Ohio

Substituted for application Serial No. 404,730, July 30, 1941. This application July 24, 1947, Serial No. 763,224

2 Claims. (Cl. 43—37)

This is a substitute application for my abandoned application, Ser. No. 404,730, filed July 30, 1941.

This invention relates to trap hooks, more particularly that type of trap hook provided with a plurality of members normally grouped together in a contracted condition and capable of being expanded for gripping the fish to assure thorough and complete snagging of the fish; and an object of this invention is to improve generally upon such types of trap hooks as are now known and used.

Other objects and features of novelty will become apparent in following the description of the preferred form of the present invention, illustrated in the accompanying drawings, wherein:

Figure 1 is an elevational view of the preferred form of the trap hook;

Figure 2 is an elevational view of the trap hook rotated to a position substantially at right angles to that shown in Figure 1;

Figure 3 is a plan view of the trap hook in expanded condition; and

Figure 4 is a transverse sectional view of the trap hook shown in Figure 3 and taken substantially on the line 4—4 thereof and in the direction of the arrows.

Referring now to the illustrated preferred embodiment of the present invention, there is a tubular carrier 5 in which are rotatably fitted the shanks 6 of two conventional fish hooks 7.

Adjacent one and thereof, the tubular member 5 is provided in the periphery thereof with a slot 8 through which the eye-equipped ends 9 of the fish hook shanks 6 extend; the eye-equipped ends of said shanks being bent at right angles to the shanks as shown.

The reference numeral 10 indicates generally what may be termed an expander member. This member 10 is formed from a single length of wire that is first bent intermediate its ends to provide a substantially triangular shaped head 11, the converging arms 12 merge into straight parallel shank portions 13, which, in turn diverge into laterally extending stops or shoulders 14.

The shoulders 14 merge into converging extensions 15 that form with the shoulders 14, a substantially triangular frame. The extensions 15 form a shank 16 by relatively twisting the terminals of the wire from which the expander 10 is made.

At the extremities of the wire, the same is rolled or bent to provide at the free end of shank 16 a double ply eye 17 through the medium of which one end of the fish line is secured to the expander element 10.

As shown, sides 12 of the head 11 of the said expander are trained through the eyes 9 of the fish hooks 7 and normally the fish hooks are in the substantially closed parallel position. This construction is shown particularly well in Figures 1 and 2. As is also apparent from these figures, the head 11 of the expander is projected forwardly relative to the eyes 9.

In use, when a fish attempts to remove the bait from the barb of the fish hook or hooks 7, a pull will be exerted, causing the tubular carrier 5 and its associated hooks to move in one direction and the expander 10, because of the pull which the fisherman will exert on the line when getting a nibble, to move in an opposite direction, or substantially to the position shown in Figure 3.

As the tubular member 5 and associated parts, along with the expander member 10 moves in directions reverse to one another, the tubular member 5 and expander member 10 will also rotate relative to one another, with the corresponding result that the hooks 7 will be caused to rotate relative to the tube from the substantially closed position shown in Figures 1 and 2, to the expanded or open position shown in Figures 3 and 4, thereby insuring an impaling of the fish on the barbs of the hooks 7. The springing of the hooks 7 apart is done quickly to insure a penetration by the hooks of the mouth of the fish.

It is also quite apparent that the hooks may be easily disgorged by pulling outwardly on the tubular member 5 so as to move the same in the direction of the stops 14. Such will result in an operation substantially opposite to that just described in snagging the fish. The movement of the tubular member 5 to the right in Figures 3, causing the eyes 9 to pass from the head 11 into the shanks 13, with parts returning to the normal position, is suggested in Figures 1 and 2.

While there is shown and described but a single embodiment of the present invention, it is apparent that various departures may be made therefrom without departing from the purview of the invention. Accordingly, limitation is sought only in accordance with the scope of the following claims.

Having described the invention, what is claimed as new is as follows:

1. In a multiple trap hook, a tubular member, a plurality of fish hooks having shanks rotatably disposed within said tubular member and having laterally extending eye-equipped ends projecting through a slot provided therefor in the periphery of said tubular member, and a substantially triangular expander element of wire frame construction, said eyes of the hooks having sliding engagement with certain of the sides of said expander element for causing opposite rotation of the shanks of the hooks on their longitudinal axes, incidental to a relative shifting movement of said tubular carrier and said expander element.

2. In a multiple trap hook, a tubular member, a plurality of fish hooks having eye equipped shanks rotatably disposed within said tubular member, said tubular member adjacent one end thereof having a slot in the periphery thereof, and said fish hooks having the eye-equipped ends of said shanks bent outwardly of said tubular member through said slot, and an expander member provided at one end thereof for connection to a fish line and provided at an opposite end thereof with a substantially triangular shaped head, the convering sides of which are trained through the eyes of said hooks.

ALBERT G. TACKETT.

No references cited.